United States Patent [19]

Moriya et al.

[11] Patent Number: 5,439,026

[45] Date of Patent: Aug. 8, 1995

[54] PROCESSING APPARATUS AND FLOW CONTROL ARRANGEMENT THEREFOR

[75] Inventors: Shuji Moriya, Yamanashi; Takenobu Matsuo; Tsuyoshi Wakabayashi, both of Kofu, all of Japan

[73] Assignee: Tokyo Electron Limited, Tokyo, Japan

[21] Appl. No.: 164,545

[22] Filed: Dec. 10, 1993

[30] Foreign Application Priority Data

| Dec. 11, 1992 | [JP] | Japan | 4-353287 |
| Dec. 25, 1992 | [JP] | Japan | 4-357986 |
| Dec. 25, 1992 | [JP] | Japan | 4-357987 |

[51] Int. Cl.⁶ .................................. G05D 7/06
[52] U.S. Cl. .................. 137/486; 137/487.5; 137/798; 137/884
[58] Field of Search .......... 137/486, 487.5, 798, 137/271, 884

[56] References Cited

U.S. PATENT DOCUMENTS

| 2,834,368 | 5/1958 | Gray | 137/271 |
| 4,422,470 | 12/1983 | Jackson | 137/501 X |
| 4,507,707 | 3/1985 | Willis | 137/884 X |
| 4,977,916 | 12/1990 | Ohmi | 137/487.5 X |

Primary Examiner—Robert G. Nilson
Attorney, Agent, or Firm—Oblon, Spivak, McClelland, Maier, & Neustadt

[57] ABSTRACT

There is disclosed a flow control apparatus including a base body having a fluid inlet and a fluid outlet and a flow path for causing the inlet to communicate with the outlet, a flow adjustment means for adjusting a flow rate of the fluid in the flow path of said base body, a flow-rate detection means for detecting the flow rate of the fluid in the flow path, and a flow control means for outputting a flow-rate control signal to the flow adjustment means on the basis of a detection result of the flow-rate detection means to control the flow rate of the fluid to a predetermined value. At least one of the fluid inlet and the fluid outlet is positioned such that the flow direction of the fluid at a corresponding one of the fluid inlet and the fluid outlet is perpendicular to the flow path.

7 Claims, 8 Drawing Sheets

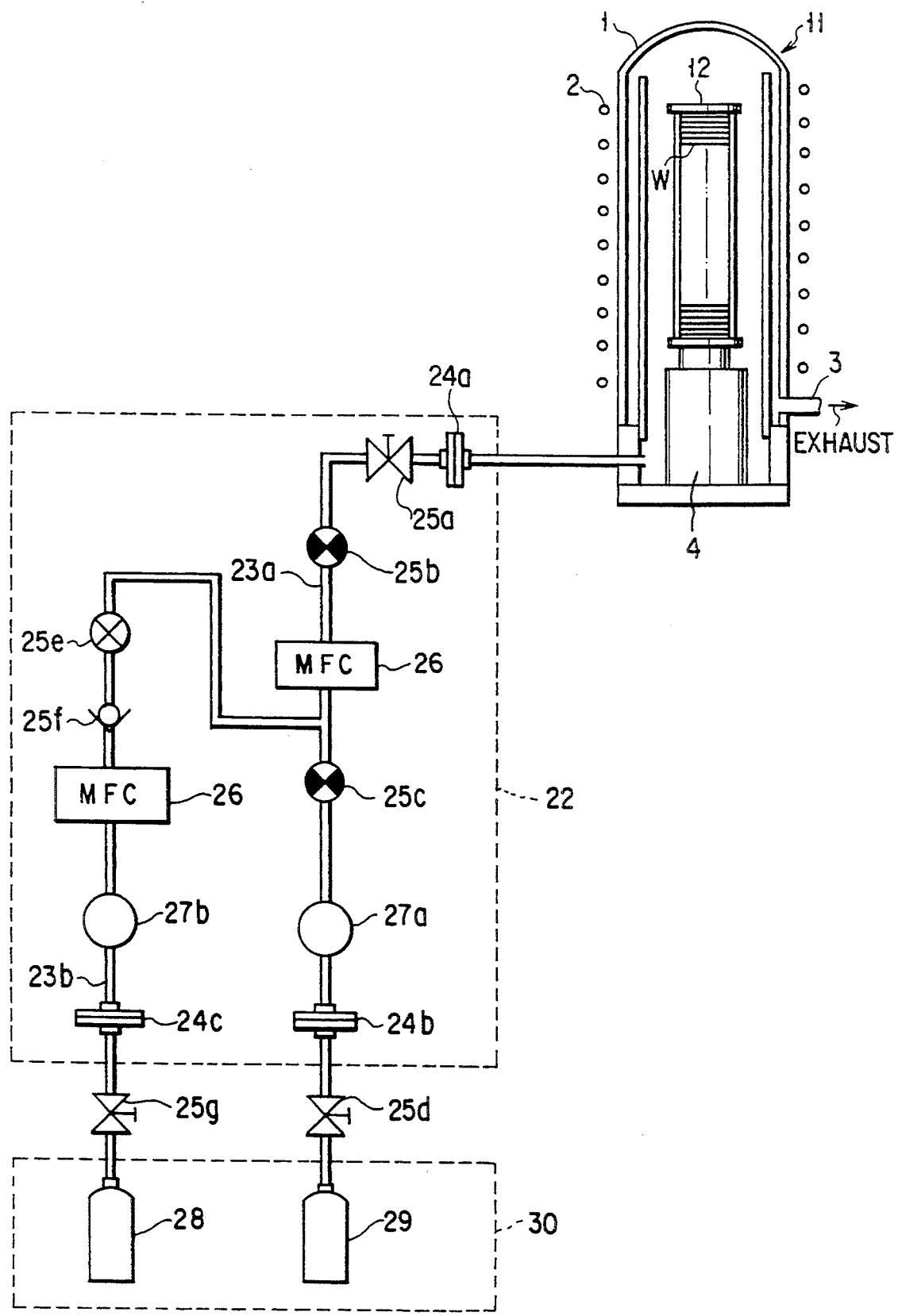
F I G. 2

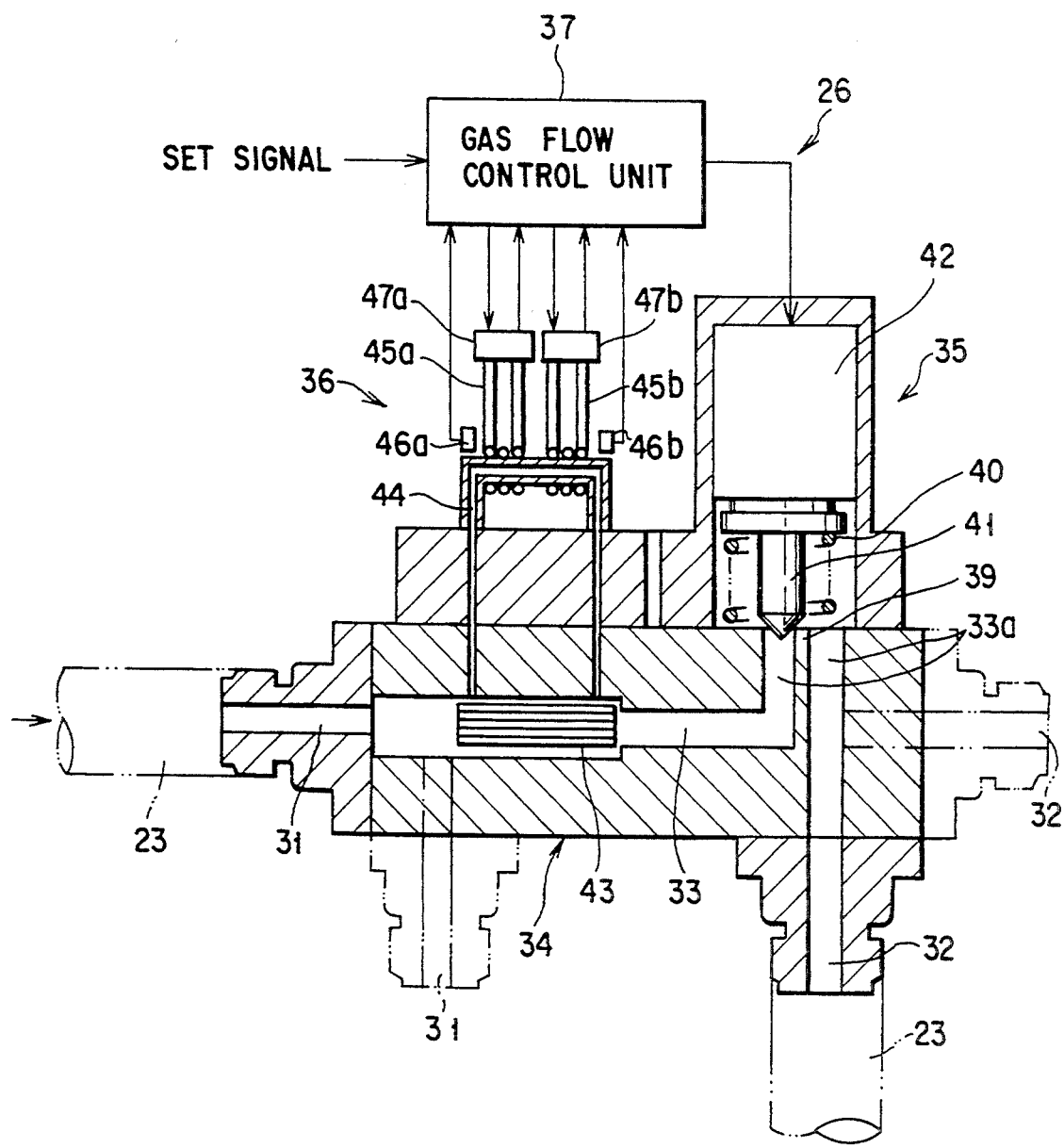
F I G. 3

PROCESSING APPARATUS AND FLOW CONTROL ARRANGEMENT THEREFOR

BACKGROUND OF THE INVENTION

1. Field of the Invention

The present invention relates to a flow control apparatus for controlling the flow rate of a gas or a liquid supplied into a processing apparatus such as an annealing apparatus for a semiconductor wafer and to a fluid supply mechanism and a processing apparatus which use the flow control apparatus.

2. Description of the Related Art

In a conventional gas supply mechanism for supplying a predetermined gas at a predetermined flow rate, a flow control apparatus, i.e., a so-called mass-flow controller, comprising a flow-rate detection sensor for detecting a gas flow rate, a gas flow adjustment mechanism, and a control mechanism for controlling the gas flow adjustment mechanism in accordance with a flow-rate detection signal from the flow-rate detection sensor is popularly used.

For example, in the manufacturing process of a semiconductor device, the mass-flow controller described above is used in a gas supply mechanism used in a heat treatment apparatus for performing processing such as film formation to a target object such as a semiconductor wafer. This mass-flow controller is arranged midway along each gas supply pipe for connecting a process vessel for performing processing such as film formation to a semiconductor wafer to gas sources for a plurality of reaction gases or carrier gases. The mass-flow controller and other piping machines such as valves and filters arranged in each gas supply pipe form a gas supply mechanism. Since the mass-flow controller serves as the principal part of the gas supply mechanism, this mechanism must be periodically subjected to inspection and maintenance more frequently than other machines.

However, in a conventional mass-flow controller, since a gas supply pipe is directly connected to a fluid inlet and a fluid outlet, the degree of freedom of piping is low, and only a planer piping structure is obtained. In addition, since the gas supply mechanism is increased in size, when maintenance of machines on the process vessel side is considered, the gas supply mechanism must be arranged apart from a process vessel. For this reason, an area occupied by the entire processing apparatus is disadvantageously increased.

Since, in addition to the low degree of freedom of piping and the planer piping structure, piping is also performed using a joint, the piping structure is complicated. Therefore, maintenance and inspection of the mass-flow controller are disadvantageously cumbersome.

SUMMARY OF THE INVENTION

It is an object of the present invention to provide a flow control apparatus in which the degree of freedom of piping is high, and an area occupied by an entire processing apparatus using the flow control apparatus is small.

It is another object of the present invention to provide a flow control apparatus whose maintenance is easily performed.

It is still another object of the present invention to provide to a fluid supply apparatus in which the degree of freedom of piping is high, and maintenance can be easily performed.

It is still another object of the present invention to provide a processing apparatus to which the flow control apparatus or the fluid supply apparatus described above is applied.

According to the first aspect of the present invention, there is provided a flow control apparatus comprising: a base body having a fluid inlet and a fluid outlet and a flow path for causing the fluid inlet to communicate with the fluid outlet; flow adjustment means for adjusting a flow rate of a fluid in the flow path of the base body; flow-rate detection means for detecting the flow rate of the fluid in the flow path; and flow control means for outputting a flow-rate control signal to the flow adjustment means on the basis of a detection result of the flow-rate detection means to control the flow rate of the fluid to a predetermined value, wherein at least one of the fluid inlet and outlet of the base body is positioned such that a flow direction of the fluid at a corresponding one of the fluid inlet and outlet is perpendicular to the flow path.

According to the second aspect of the present invention, there is provided a flow control apparatus comprising: a base body having a fluid inlet and a fluid outlet and a flow path for causing the fluid inlet to communicate with the fluid outlet; flow adjustment means for adjusting a flow rate of a fluid in the flow path of the base body; flow-rate detection means for detecting the flow rate of the fluid in the flow path; flow control means for outputting a flow-rate control signal to the flow adjustment means on the basis of a detection result of the flow-rate detection means to control the flow rate of the fluid to a predetermined value; and a joint detachably mounted on at least one of the fluid inlet and the fluid outlet.

According to the third aspect of the present invention, there is provided a flow control apparatus comprising: a plurality of flow control units each including a base body having a fluid inlet and a fluid outlet and a flow path for causing the fluid inlet to communicate with the fluid outlet; flow adjustment means for adjusting a flow rate of a fluid in the flow path of the base body, flow-rate detection means for detecting the flow rate of the fluid in the flow path, and flow control means for outputting a flow-rate control signal to the flow adjustment means on the basis of a detection result of the flow-rate detection means to control the flow rate of the fluid to a predetermined value; and a block-like joint detachably mounted to continue to at least one of the fluid inlet and the fluid outlet of each of the base bodies and having connection ports of fluid pipes communicating with the flow paths of the base body for the flow control units.

According to the fourth aspect of the present invention, there is provided a fluid supply apparatus for supplying a fluid into a processing apparatus, comprising: a piping; a flow control apparatus, having a fluid inlet and a fluid outlet and a flow path for causing the fluid inlet to communicate with the fluid outlet, for controlling a flow rate of a fluid flowing in the piping; a valve for opening/closing the piping; and a casing for storing the pipe, the flow control apparatus, and the valve, wherein at least one of the fluid inlet and the fluid outlet of the flow control apparatus is positioned such that a flow direction of the fluid at a corresponding one of the fluid inlet and the fluid outlet is perpendicular to the flow path, and the flow control apparatus is positioned near a wall portion of the casing.

According to the fifth aspect of the present invention, there is provided a processing apparatus comprising: a process unit for performing specific processing to a target object; a fluid source for supplying a fluid required for the processing into the process unit; and a flow control apparatus for controlling a flow rate of the fluid supplied from the fluid source into the process unit, the fluid control apparatus including a base body having a fluid inlet and a fluid outlet and a flow path for causing the fluid inlet to communicate with the fluid outlet, flow adjustment means for adjusting a flow rate of the fluid in the flow path of the base body, flow-rate detection means for detecting the flow rate of the fluid in the flow path, and flow control means for outputting a flow-rate control signal to the flow-rate adjustment means on the basis of a detection result of the flow-rate detection means to control the flow rate of the fluid to a predetermined value, wherein at least one of the fluid inlet and the fluid outlet of the base body is positioned such that a flow direction of the fluid at a corresponding one of the fluid inlet and the fluid outlet is perpendicular to the flow path.

According to the sixth aspect of the present invention, there is provided a processing apparatus comprising: a process unit for performing specific processing to a target object; a fluid source for supplying a fluid required for the processing into the process unit; and a flow control apparatus for controlling a flow rate of the fluid supplied from the fluid source into the process unit, the fluid control apparatus including a base body having a fluid inlet and a fluid outlet and a flow path for causing the fluid inlet to communicate with the fluid outlet, flow adjustment means for adjusting a flow rate of the fluid in the flow path of the base body, flow-rate detection means for detecting the flow rate of the fluid in the flow path, flow control means for outputting a flow-rate control signal to the flow-rate adjustment means on the basis of a detection result of the flow-rate detection means to control the flow rate of the fluid to a predetermined value, and a joint detachably mounted on at least one of the fluid inlet and the fluid outlet.

According to the seventh aspect of the present invention, there is provided a processing apparatus comprising: a process unit for performing specific processing to a target object; a fluid source for supplying a fluid required for the processing into the process unit; and a flow control apparatus for controlling a flow rate of the fluid supplied from the fluid source into the process unit, the fluid control apparatus including: a plurality of flow control units each having a base body having a fluid inlet and a fluid outlet and a flow path for causing the fluid inlet to communicate with the fluid outlet, flow adjustment means for adjusting a flow rate of the fluid in the flow path of the base body, flow-rate detection means for detecting the flow rate of the fluid in the flow path, and flow control means for outputting a flow-rate control signal to the flow-rate adjustment means on the basis of a detection result of the flow-rate detection means to control the flow rate of the fluid to a predetermined value; and a block-like joint detachably mounted to continue at least one of the fluid inlet and the fluid outlet of each of the base bodies and having connection ports of fluid pipes communicating with the flow paths of the base body for the flow control units.

According to the eighth aspect of the present invention, there is provided a processing apparatus comprising: a process unit for performing specific processing to a target object; a fluid source for supplying a fluid required for the processing into the process unit; and a fluid supply apparatus for supplying the fluid from the fluid source into the process unit, the fluid supply apparatus including: a pipe; a flow control apparatus, having a fluid inlet and a fluid outlet and a flow path for causing the fluid inlet to communicate with the fluid outlet, for controlling a flow rate of the fluid flowing in the pipe; a valve for opening/closing the pipe; and a casing for storing the pipe, the flow control apparatus, and the valve, wherein at least one of the fluid inlet and the fluid outlet of the flow control apparatus is positioned such that a flow direction of the fluid at a corresponding one of the fluid inlet and the fluid outlet is perpendicular to the flow path, and the flow control apparatus is positioned near a wall portion of the casing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a view for explaining a gas line of the apparatus in FIG. 1;

FIG. 3 is a sectional view showing a flow control apparatus according to an embodiment of the present invention;

DETAILED DESCRIPTION OF THE PREFERRED EMBODIMENTS

Preferable embodiments of the present invention will be described in detail below with reference to the accompanying drawings.

Figure 1:
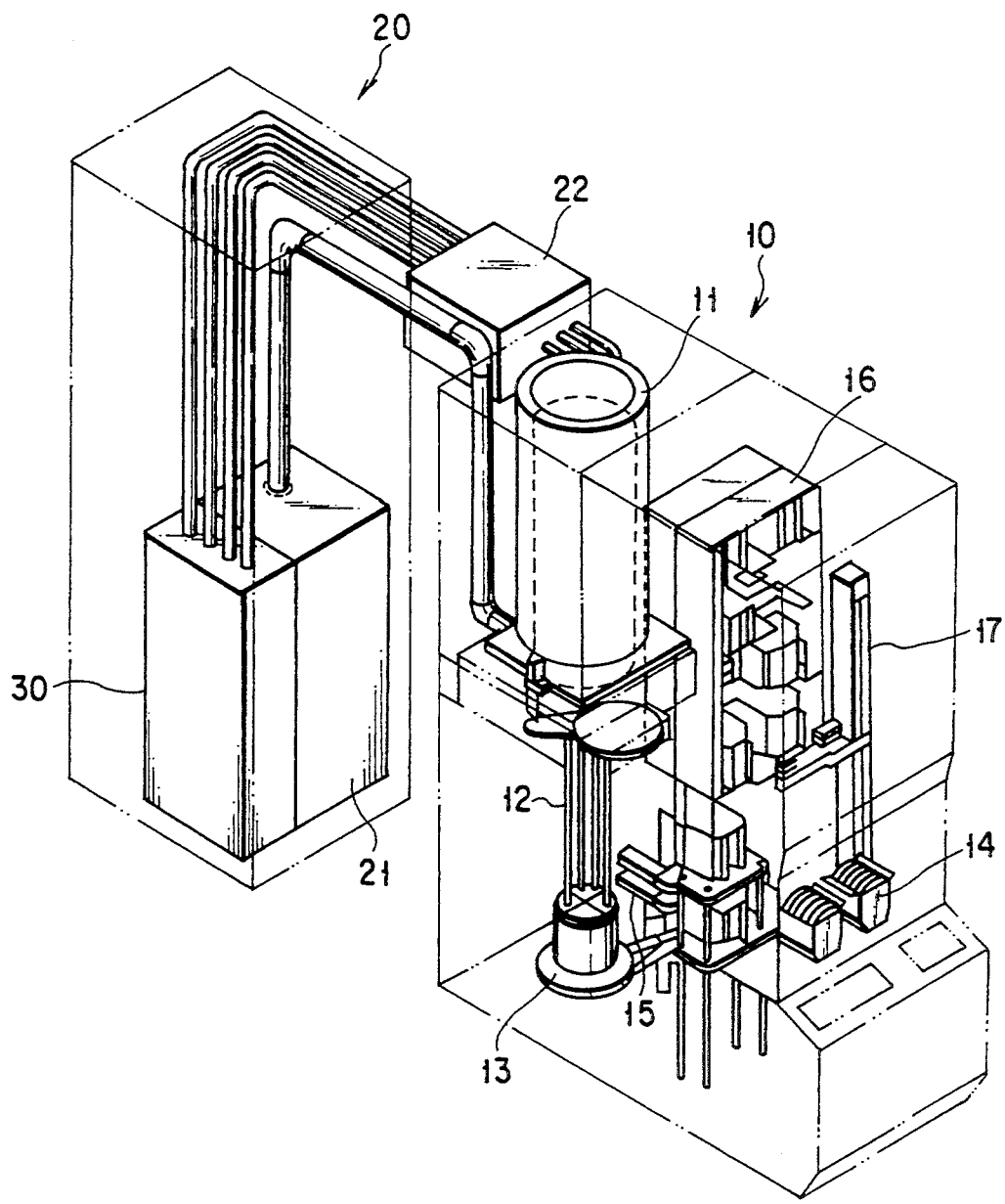
FIG. 1 is a perspective view showing a vertical annealing apparatus to which the present invention is applied.

FIG. 1 is a perspective view showing the arrangement of a vertical heat treatment apparatus to which a flow control apparatus according to the present invention is applied. This vertical heat treatment apparatus is constituted by a heat treatment unit 10 and a gas supply unit 20 arranged at the rear portion of the heat treatment unit.

The heat treatment unit 10 comprises a cylindrical heat treatment furnace 11 arranged substantially vertically. A boat elevator 13 for vertically moving a wafer boat 12 on which a plurality of semiconductor wafers are placed is arranged under the annealing furnace 11. The wafer boat 12 on which the wafers are placed is loaded/unloaded by the boat elevator 11 into/from the heat treatment furnace 11. A transfer mechanism 15 for transferring semiconductor wafers between wafer cassettes 14 and the wafer boat 12 is arranged in front of the boat elevator 13. A cassette storage mechanism 16 for storing the plurality of wafer cassettes 14 and a convey mechanism 17 for conveying the wafer cassettes 14 are arranged above the transfer mechanism 15.

The supply unit 20 comprises an evacuation mechanism 21 for evacuating the heat treatment furnace 11, a gas supply mechanism 22, arranged near the annealing furnace, for supplying gases such as a purge gas, a process gas, and a carrier gas, and a gas source unit 30 arranged adjacent to the evacuation mechanism 21 and storing gas sources. A process gas is supplied from the gas source unit 30 into the heat treatment furnace 11 through the gas supply mechanism 22 while the heat treatment furnace 11 is exhausted by the evacuation mechanism 21, so as to bring the heat treatment furnace 11 to a low-pressure atmosphere having a predetermined gas pressure. Heat-treatment such as film formation processing is performed in this atmosphere.

Gas lines extending from the gas source unit 30 to the annealing furnace 11 through the gas supply mechanism 22 will be described below with reference to FIG. 2. FIG. 2 shows only one of a plurality of gas lines. A process gas such as $SiH_2Cl_2$ is filled in a process gas source 29, and the process gas source 29 is connected to the furnace 11 through a process gas supply pipe 23a. A valve 25d, a filter 24b, a regulator 27b, an air-operated valve 25c, a flow control apparatus (mass-flow controller) 26, an air-operated valve 25b, and a valve 25a are arranged between the process gas source 29 and the furnace 11. A gas supply pipe 23b is connected to a purge gas source 28 for a purge gas consisting of an inert gas such as pure nitrogen, and the gas supply pipe 23b is connected between the mass-flow controller 26 and the valve 25c of the gas supply pipe 23a. A valve 25g, a filter 24c, a regulator 27b, a mass-flow controller 26, a check valve 25f, and a valve 25e are inserted in the pipe 23b. With the above arrangement, any one of the process gas and the purge gas can be selectively supplied into the furnace 11 at a predetermined flow rate. The heat treatment furnace 11 comprises a process tube 1 and a heater 2 arranged around the process tube 1. The wafer boat 12 on which wafers W are placed is inserted in the process tube 1 such that the wafer boat 12 is placed on a heat insulating cylinder 4. A gas exhaust port 3 is formed in the process tube 1, and the evacuation mechanism 21 described above is connected to the gas exhaust port 3.

Although, for example, a silicon nitride film is formed on each wafer by the annealing furnace, in this case, an $NH_3$ (ammonia) gas is used in addition to the $SiH_2Cl_2$ (dichlorosilane) gas. An ammonia gas is supplied into the furnace 11 through another gas line (not shown in FIG. 2).

A mass-flow controller 26 serving as a flow control apparatus will be described below. FIG. 3 is a sectional view showing this mass-flow controller. The mass-flow controller 26 comprises a base body 34 having a flow path 33 for causing a gas inlet 31 to communicate with a gas outlet 32, a gas flow adjustment mechanism 35 serving as a flow adjustment means for controlling the flow rate of a gas in the flow path 33 of the base body 34, a flow-rate detection sensor 36 serving as a flow-rate detection means for detecting the flow rate of the gas in the flow path 33, and a gas flow control unit 37 serving as a control means for controlling the gas flow adjustment mechanism 35 such that the flow rate of the gas is set to be a predetermined value by the flow-rate detection sensor 36.

In this mass-flow controller, the outlet 32 is positioned such that its gas flow direction is perpendicular to the flow path 33, and the flow path 33 and the outlet 32 are arranged to constitute an L-shaped structure. Note that the inlet 31 can also be positioned such that its gas flow direction is perpendicular to the flow path 33, and the flow path 33 and any one of the inlet 31 and the outlet 32 may be arranged to constitute an L-shaped structure. Otherwise, both the inlet 31 and the outlet 32 may be formed to constitute L-shaped structures with the flow path 33 (chain double-dashed line in FIG. 3).

The gas flow adjustment mechanism 35 is constituted by a valve seat 39 arranged at one part of a bypass portion 33a arranged on the outlet side of the flow path 33, a valve body 41 arranged such that a compression spring 40 is interposed between the valve seat 39 and the valve body 41, and an actuator 42 for seating the valve body 41 on the valve seat 39 against the elastic force of the compression spring 40. For example, a piezoelectric element, a solenoid, or an extendible heating wire can be used as the actuator 42.

The gas flow-rate detection sensor 36 has a pipe 44 having an almost inverted U shape for flowing part of a gas flowing from the inlet 31 to the flow path 33. Heating wires 45a and 45b are wound on the parallel portion of the inverted U-shaped pipe 44 at predetermined intervals. Temperature sensors 46a and 46b are arranged near portions where the heating wires 45a and 45b are wound, respectively. The heating wires 45a and 45b are connected to power supplies 47a and 47b, respectively, and the power supplies 47a and 47b apply voltages to the heating wires 45a and 45b, respectively.

Figure 6:
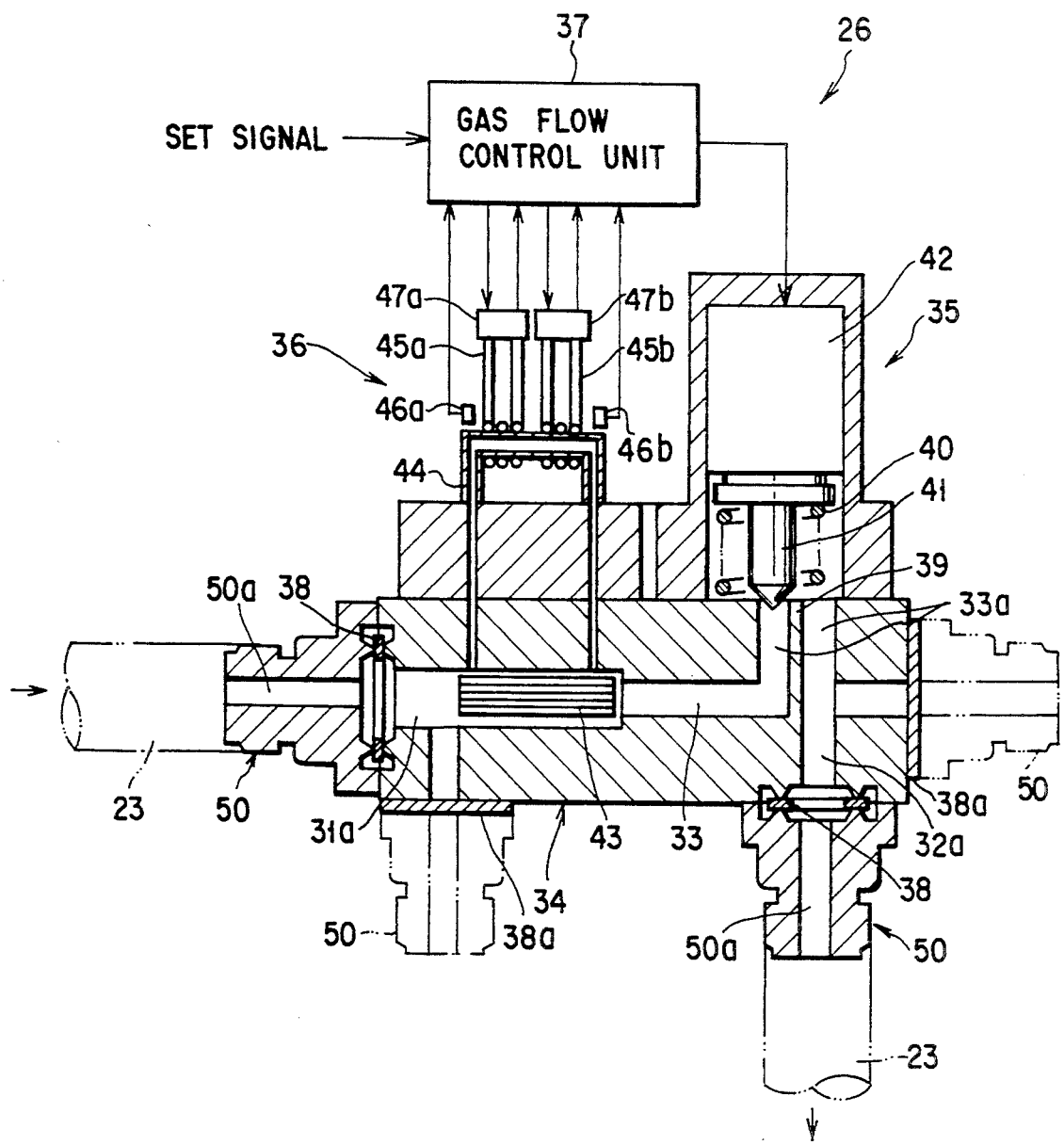
FIG. 6 is a sectional view showing a flow control apparatus according to another embodiment of the present invention.

The power supplies 47a and 47b and the temperature sensors 46a and 46b are connected to the gas flow control unit 37. In the gas flow control unit 37, a temperature difference generated by a gas flow is detected by the temperature sensors 46a and 46b, signals are output to the power supplies 47a and 47b to apply the voltages to the heating wires 45a and 45b until the temperature difference becomes zero, and a gas flow rate is obtained by the difference between the voltages. The value of the difference between the voltages is compared with the value of a voltage corresponding to a set signal, and a control signal is output to the gas flow adjustment mechanism 35 such that the gas flow rate is set to be a desired flow rate in accordance with the comparison result. In the gas flow adjustment mechanism 35, the valve body 41 is driven by the control signal to adjust the sectional area of a portion corresponding to the valve seat 39 of the flow path 33, thereby setting the gas flow rate to be a predetermined value. Note that a straightening vane 43 is formed in a portion of the flow path 33 where the pipe 44 is connected to the flow path 33. As shown in FIG. 6, a straightening vein 43 is an orifice consisting of a bundle of thin pipes, the presence of which permits a predetermined portion of the gas flowing through the gas inlet 31 to be guided into the pipe 44 making it possible to determine the entire gas flow rate based upon the gas flow rate within the pipe 44.

As should be apparent from the foregoing, a temperature higher than the gas temperature is set in the gas flow control unit to form a gas stream. A gas stream of a lower temperature flows into the portion of the pipe 44 adjacent to the coil 45a. The gas stream is heated by the coil 45a, with the result that a gas stream of a higher temperature flows into the portion of the pipe 44 corresponding to the coil 45b. Further, as should be readily recognized, the temperature difference of the gas stream between the respective regions corresponding to the coils 45a and 45b is dependent upon the gas flow rate. In order to make the temperature difference zero, the temperature signals generated from the sensors 46a and 46b are supplied to the gas flow control unit as discussed above. These temperatures are compared within the control unit and based upon the result of the comparison the output signals supplied to the power sources 47a, 47b are controlled to increase the voltage of the coil corresponding to the low temperature region, and the operation is continued until the difference between the detected temperature signals becomes zero.

Thus, it should be noted that the difference in the voltage between the coils 45a and 45b is a function of the gas flow rate, and the gas flow rate is calculated on the basis of the voltage difference. Further, the control signal is supplied to the gas flow adjustment mechanism 35 based on the calculated gas flow rate.

In the flow control apparatus arranged as described above, since the inlet 31 and/or the outlet 32 is arranged perpendicularly to the flow path 33 as described above, the direction of the gas supply pipe 23 can be selected within a wide range, and the degree of freedom of arrangement of the mass-flow controller 26, the gas supply pipe 23, the filter 24, the valve 25, and the like can be increased. For this reason, the piping system of the gas supply mechanism 22 can be easily connected to the flow control apparatus. In addition, when the gas supply pipe 23 is connected to the flow path 33 to constitute an L-shaped structure, the size the mass-flow controller 26 itself can be reduced, and the gas supply pipe 23 can be three-dimensionally arranged, thereby reducing the size of the gas supply mechanism 22. In addition, when the size of the gas supply mechanism 22 is reduced, the gas supply mechanism 22 can be arranged on the heat treatment unit 10 side without causing any trouble in maintenance of the heat treatment apparatus main body. Note that, when the mass-flow controller is arranged as described above, the size of the gas supply mechanism 22 can be reduced by about 70%.

Figure 4:
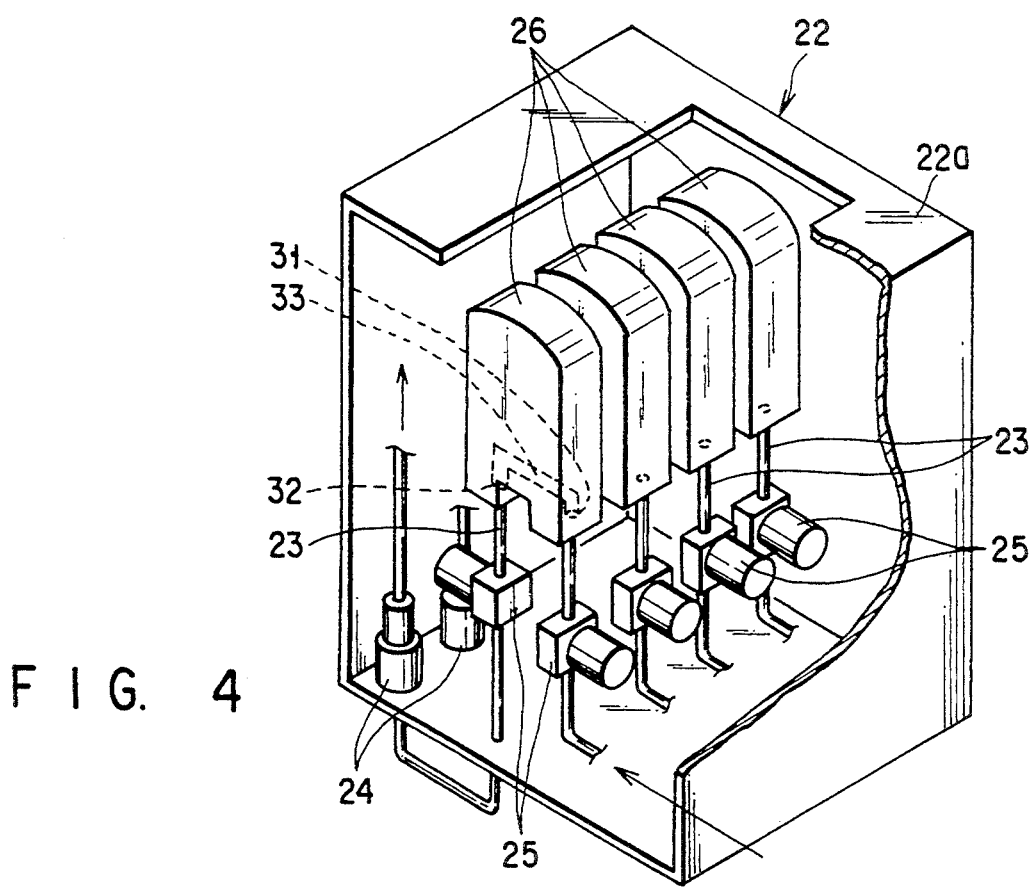
FIG. 4 is a perspective view showing the gas supply mechanism of the apparatus in FIG. 1.

In this case, the gas supply mechanism 22 can be arranged as shown in FIG. 4. In the gas supply mechanism 22, a casing 22a, and the plurality of gas supply pipes 23 corresponding in number to the types of gases to be used are arranged. The filters 24, the valves 25, the mass-flow controllers 26 serving as flow control apparatuses, and the like are arranged to the gas supply pipes 23. As described above, when each of the inlets 31 and/or each of the outlets 32 is arranged perpendicularly to a corresponding one of the flow paths 33 as described above, as shown in FIG. 4 (both the inlet 31 and the outlet 32 are perpendicular to the flow path 33 in FIG. 4), the mass-flow controllers 26 can be arranged near the wall portion of the casing 22a, and maintenance of the mass-flow controllers 26 which must be subjected to maintenance and inspection more frequently than other apparatuses is advantageously facilitated.

Figure 5:
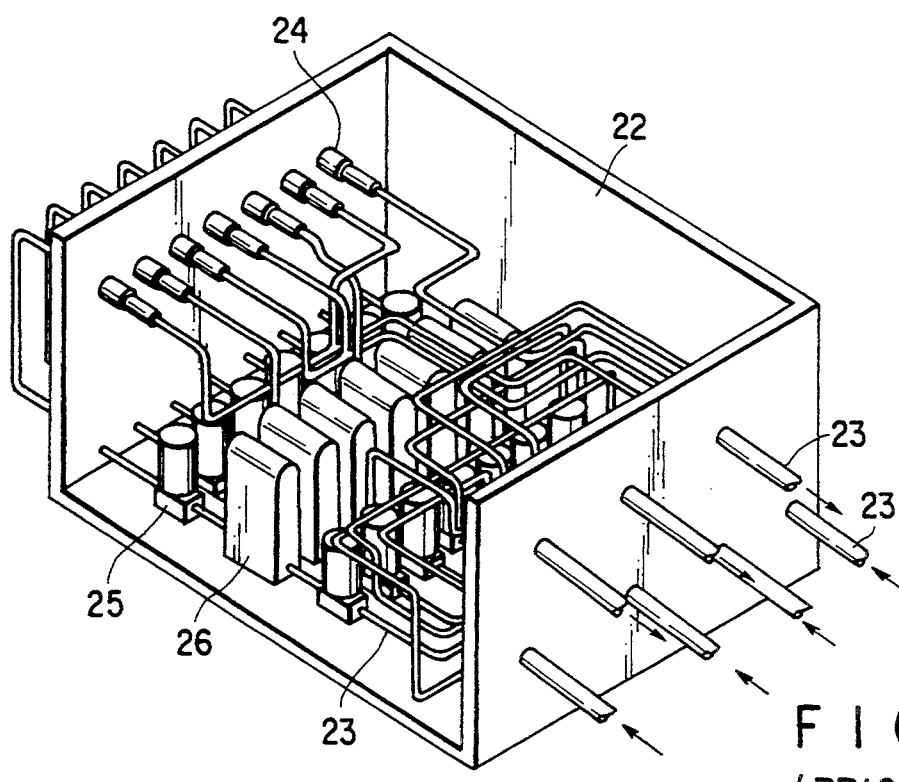
FIG. 5 is a perspective view showing a conventional gas supply mechanism.

As shown in FIG. 5, in a conventional gas supply mechanism, since the mass-flow controllers 26 are arranged at the central portion of the gas supply mechanism 22, maintenance of the mass-flow controllers 26 is disadvantageously cumbersome. This problem can be solved by the arrangement described above.

Another embodiment will be described below.

In this embodiment, a mass flow controller 26 has, as shown in FIG. 6, gas inlets 31a and 31b and outlets 32a and 32b which are selectively used. Joints 50 for connecting gas supply pipes 23 through seal members 38 such as O-rings or metal seals are detachably mounted on the inlet and outlet to be used (the inlet 31a and the outlet 32a in FIG. 6).

The inlet 31b and outlet 32b which are not used in FIG. 6 are blocked by blocking members 38a.

Other parts in FIG. 6 are arranged in the same manner as that of the mass-flow controller in FIG. 3.

Figure 7:
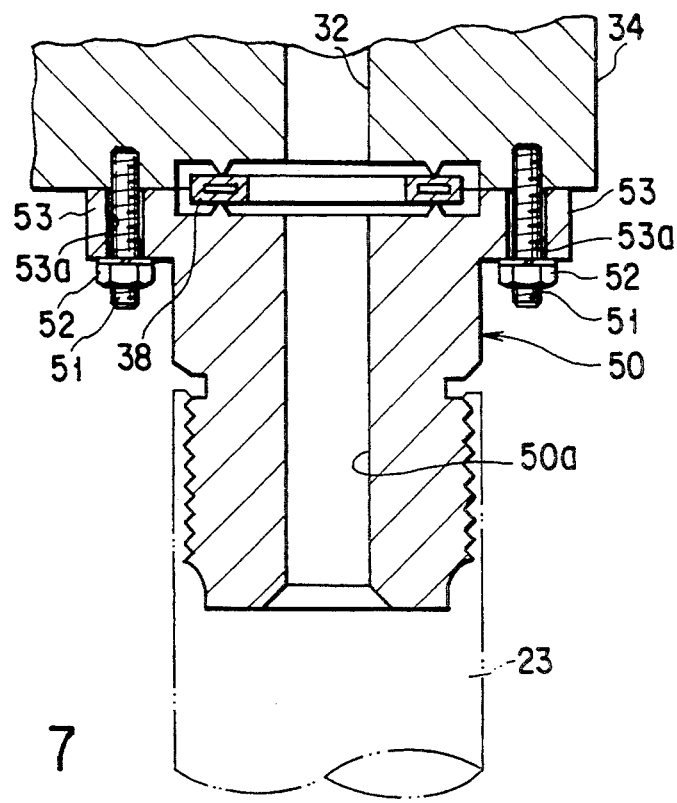
FIG. 7 is an enlarged sectional view showing a mounted state of a joint in the apparatus in FIG. 6.

As shown in FIG. 7, each of the joints 50 is mounted on a base body 34 by mounting bolts 51 extending from the peripheral portion of an outlet 32 (or inlet 31) of the main body 34 and nuts 52 fastened to the mounting bolts 51. In this case, the seal member 38 is interposed between the base body 34 and the joint 50, mounting holes 53a formed in a mounting flange 53 of the joint 50 are loosely fastened to the mounting bolts 51, and the nuts 52 are fastened to the mounting bolts 51, so that the joint 50 can be detachably mounted on the base body. In this structure, since the seal member 38 is interposed between the joint 50 and the base body 34, the connection portion between the base body 34 and the joint 50 can be kept airtight. In addition, when a metal seal is used as the seal member 38, the seal member can have corrosion resistance. In particular, when stainless steel or an Ni-based alloy is used as the material of the metal seal, a higher corrosion resistance can be obtained. Note that the blocking member 38a can be detachably mounted by bolts and nuts like the joint 50.

When the mass-flow controller 26 is arranged as described above, maintenance of the mass-flow controller 26 can be performed after the joint 50 is removed from the pipe 23. For this reason, the maintenance can be easily performed. In addition, since an inlet and an outlet can be arbitrarily selected as needed, the degree of freedom of piping can be further improved. That is, the degree of freedom of arrangement of the gas supply pipes 23, filters 24, valves 25, and the like can be improved, thereby easily connecting the piping systems of a gas supply mechanism 22 to the mass-flow controller. When the joint 50 is mounted on the inlet 31b or outlet 32a, a path 50a of the joint 50 is perpendicular to a flow path 33 to constitute an L-shaped structure. In this case, as in the embodiment described above, the size of the mass-flow controller 26 itself can be reduced, and the gas supply pipe 23 can be three-dimensionally arranged, thereby reducing the size of the gas supply mechanism 22. In addition, when the size of the gas supply mechanism 22 is reduced, the gas supply mechanism 22 can be arranged on the side of the heat treatment unit 10 without causing any trouble in maintenance of an annealing apparatus 10.

Note that, in FIG. 6, although the two inlets and the two outlets are arranged perpendicularly to each other, the number of inlets or outlets is not limited to two, and three or more inlets and three or more outlets may be arranged. In this case, joints may be connected to the inlets and outlets to be used. In addition, a plurality of inlets and outlets need not be used. In this case, when the joints are detachably mounted, at least the advantage that the maintenance of the heat treatment unit 10 can be advantageously facilitated is maintained.

The case wherein the joints 50 are detachably mounted on the mass-flow controllers 26, respectively, has been described above. However, a block-like joint can also be simultaneously mounted on the plurality of mass-flow controllers 26.

Figure 8:
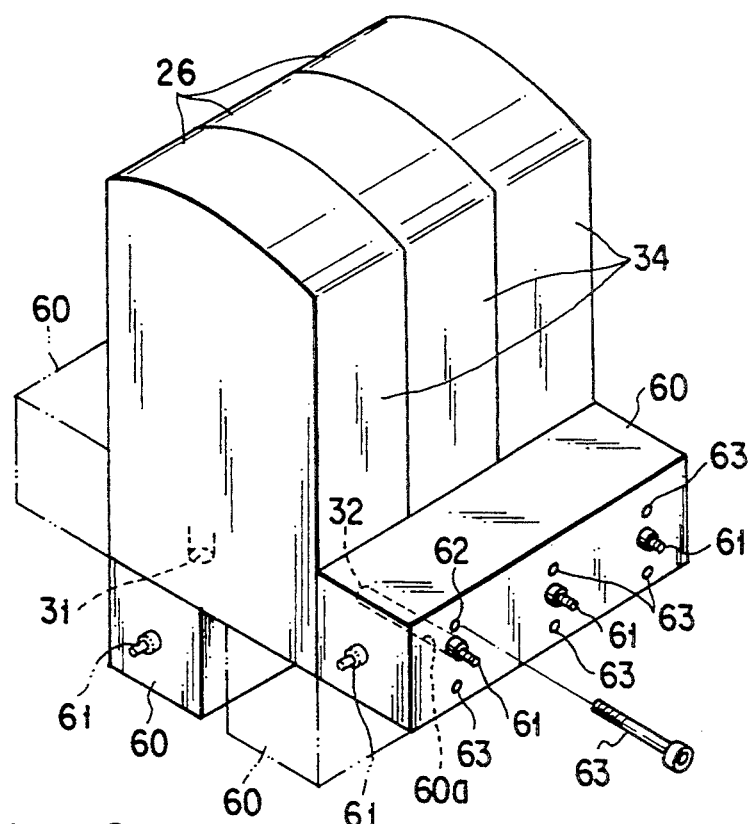
FIG. 8 is a sectional view showing a flow control apparatus according to still another embodiment of the present invention.

That is, as shown in FIG. 8, a block-like joint 60 having gas flow paths 60a and connection ports 61 of the gas supply pipes 23 communicating with the flow paths of the base bodies can be detachably mounted, through a seal member, on at least one of a gas inlet and a gas outlet arranged to each of the base bodies 34 of the mass-flow controllers 26 arranged described above. In this case, each of the connection ports 61 of the block-like joint 60 can be positioned parallelly or perpendicularly to a corresponding one of the flow paths of the base bodies, and an arbitrary piping shape can be obtained as needed.

Figure 9A:
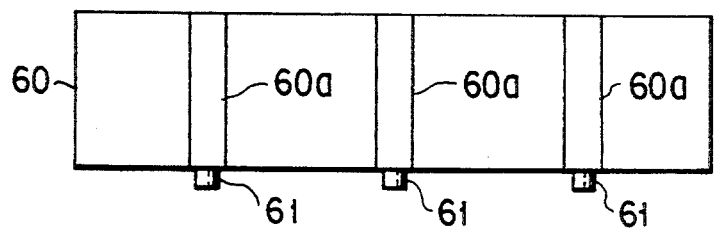
FIGS. 9A to 9D are views illustrating the structures of a block-like joint in FIG. 8.
Figure 9B:
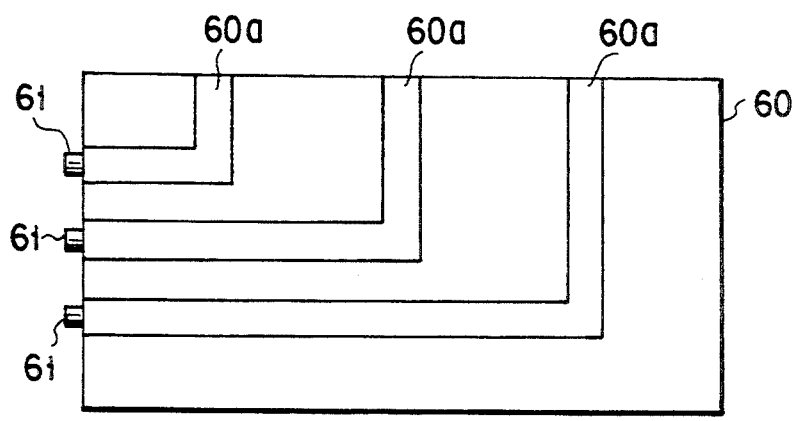
Figure 9C:
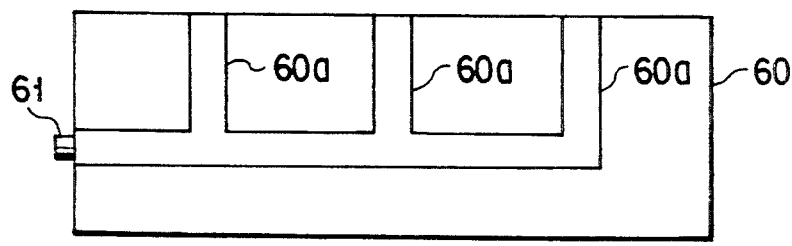
Figure 9D:
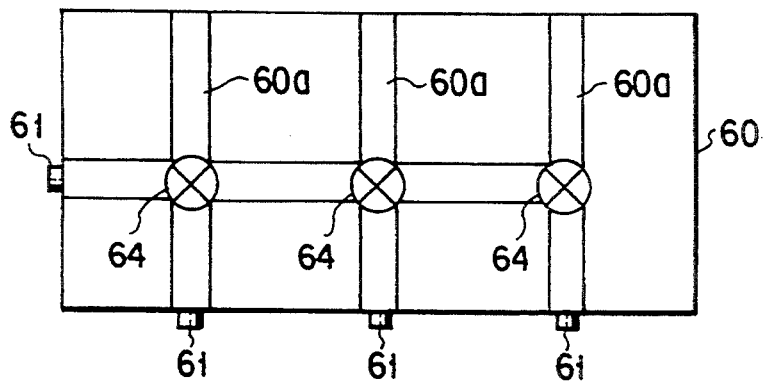

In the block-like joint 60, the gas flow paths 60a and the connection ports 61 can vary in accordance with piping systems. The structures of the gas flow paths 60a and the connection ports 61 are shown in FIGS. 9A to 9D. FIG. 9A shows an example wherein each of gas flow paths 60a is linearly arranged. FIG. 9B shows an example wherein connection ports 61 corresponding to gas flow paths 60a are arranged on a side wall of the block-like joint. FIG. 9C shows an example wherein gas flow paths 60a are merged to be connected to one connection port 61. FIG. 9D shows an example wherein the embodiments in FIGS. 9A and 9C can be selectively employed using valves 64.

Note that, in order to mount the block-like joint 60 on the base bodies 34, mounting bolts 63 respectively extending through mounting holes 62 formed in the block-like joint 60 are preferably threadably engaged in mounting holes (not shown) formed in the base bodies 34.

As described above, when the block-like joint 60 can be detachably mounted on at least one of the inlet and outlet of each of the plurality of mass-flow controllers 26, the number of parts can be reduced, and a piping operation can be easily performed. In addition, since a flow control unit can be formed as a unit, the size of the gas supply mechanism 22 can be further reduced, and maintenance of the gas supply mechanism 22 can be facilitated.

Figure 10:
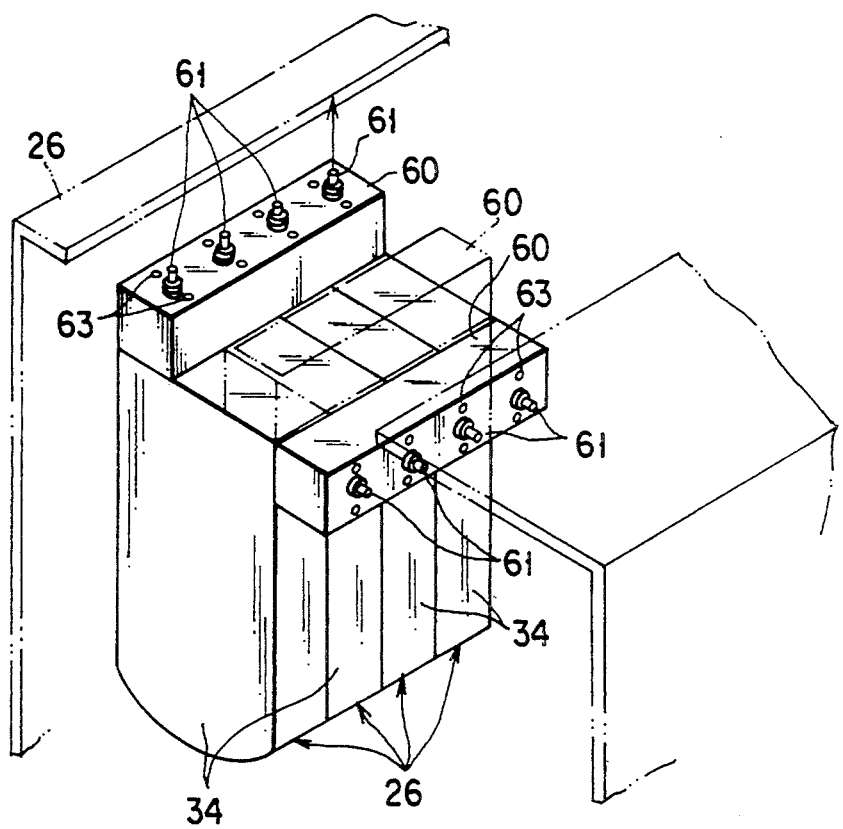
FIG. 10 is a view showing a modification of the arrangement of the flow control apparatus in FIG. 8.

The arrangement shape of the arrangement of the mass-flow controller 26 can be freely selected from various arrangement shapes. As shown in FIG. 10, the inlets 31 and outlets 32 may be positioned at an upper or side position, i.e., the inlets 31 and outlets 32 can be arranged at an arbitrary position.

Figure 11:
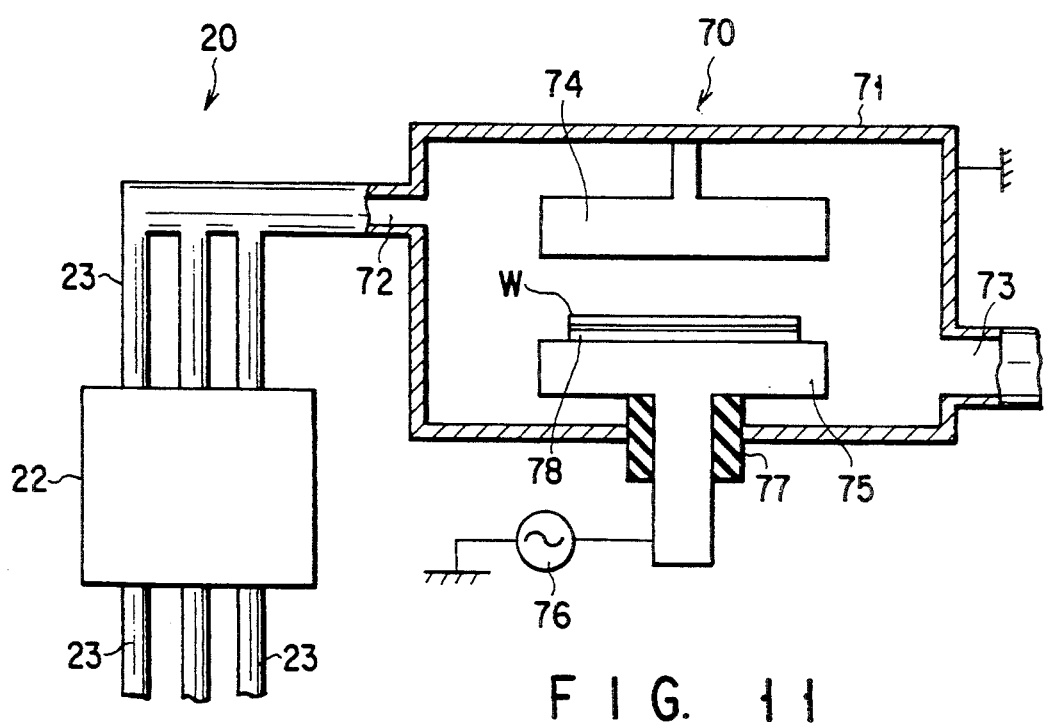
FIG. 11 is a sectional view showing a plasma etching apparatus to which the present invention is applied.

In the above embodiments, although a case wherein the present invention is applied to a vertical heat treatment apparatus is described above, the present invention can be applied to another processing apparatus. For example, the present invention can be applied to an etching apparatus. This example will be described with reference to FIG. 11. FIG. 11 is a plasma etching apparatus to which the present invention is applied. This apparatus has a process unit 70 and a gas supply unit 20.

The process unit 70 comprises a process vessel 71 having a process gas supply port 72 and an exhaust port 73, an upper electrode 74, a lower electrode 75, and an RF power supply 76. The upper electrode 74 and the lower electrode 75 are arranged in the process vessel 71 to keep their surfaces horizontal. An electrostatic chuck 78 is arranged on the lower electrode 75, and a semiconductor wafer W serving as a target body is attracted to the electrostatic chuck 78. The RF power supply 76 is connected to the lower electrode 75. When the RF power supply 76 applies RF power to the lower electrode 75, the plasma of a process gas is produced between the electrodes 74 and 75. The process vessel 71 is insulated from the lower electrode 75 by an insulating member 77.

A gas supply unit 20 has basically the same as the one described above, and has a gas supply mechanism 22 having a flow control apparatus (mass-flow controller) according to the present invention. Gases such as a process gas supplied from a plurality of gas sources (not shown) to the gas supply mechanism 22 through gas supply pipes 23 are supplied into the process vessel 71 through the gas supply pipes 23.

In the above apparatus, the pressure in the process vessel 71 is reduced to the predetermined degree of vacuum, a process gas is supplied from the gas supply mechanism 22 into the process vessel through the gas supply pipes 23, and the RF power supply 76 applies RF power across the electrodes 74 and 75, thereby producing the plasma of the process gas therebetween. The semi-conductor wafer is etched in this plasma.

In the above example, although the apparatus using a gas as a fluid has been described, the present invention can also be applied to an apparatus using a liquid as a fluid.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A flow control apparatus comprising:
a plurality of flow control units each including a base body having a fluid inlet and a fluid outlet and a flow path for causing the fluid inlet to communicate with the fluid outlet flow adjustment means for adjusting a flow rate of a fluid in the flow path of said base body, flow-rate detection means for detecting the flow rate of the fluid in the flow path, and flow control means for outputting a flow-rate control signal to said flow adjustment means on the basis of a detection result of said flow-rate detection means to control the flow rate of the fluid to a predetermined value; and
a block-like joint detachably mounted to continue to at least one of the fluid inlet and the fluid outlet of each of said base bodies and having connection ports of fluid pipes communicating with the flow paths of said base body for said flow control units.

2. An apparatus according to claim 1, wherein said base body for said flow control units has another inlet, and said block-like joint is detachably mounted to continue one of the inlets.

3. An apparatus according to claim 1, wherein said base body for said flow control units has another outlet, and said block-like joint is detachably mounted to continue one of the outlets.

4. An apparatus according to claim 1, wherein, in each of said flow control units, at least one of the fluid inlet and the fluid outlet of said base body is positioned such that a flow direction of a fluid at a corresponding one of the fluid inlet and the fluid outlet is perpendicular to the flow path.

5. A fluid supply apparatus for supplying a fluid into a processing apparatus, comprising:
   a piping;
   a flow control apparatus, having a fluid inlet and a fluid outlet and a flow path for causing the fluid inlet to communicate with the fluid outlet, for controlling a flow rate of a fluid flowing in said piping;
   a valve for opening/closing said piping; and
   a casing for storing said piping, said flow control apparatus, and said valve,
   wherein at least one of the fluid inlet and the fluid outlet of said flow control apparatus is positioned such that a flow direction of the fluid at a corresponding one of the fluid inlet and the fluid outlet is perpendicular to the flow path, and said flow control apparatus is positioned near a wall portion of said casing.

6. A processing apparatus comprising:
   a process unit for performing specific processing to a target object;
   a fluid source for supplying a fluid required for the processing into said process unit; and
   a flow control apparatus for controlling a flow rate of the fluid supplied from said fluid source into said process unit,
   said fluid control apparatus including:
      a plurality of flow control units each having a base body having a fluid inlet and a fluid outlet and a flow path for causing the fluid inlet to communicate with the fluid outlet, flow adjustment means for adjusting a flow rate of the fluid in the flow path of said base body, flow-rate detection means for detecting the flow rate of the fluid in the flow path, and flow control means for outputting a flow-rate control signal to said flow-rate adjustment means on the basis of a detection result of said flow-rate detection means to control the flow rate of the fluid to a predetermined value; and
   a block-like joint detachably mounted to continue at least one of the fluid inlet and the fluid outlet of each of said base bodies and having connection ports of fluid pipes communicating with the flow paths of said base body for said flow control units.

7. A processing apparatus comprising:
   a process unit for performing specific processing to a target object;
   a fluid source for supplying a fluid required for the processing into said process unit; and
   a fluid supply apparatus for supplying the fluid from said fluid source into said process unit,
   said fluid supply apparatus including:
      a pipe;
      a flow control apparatus, having a fluid inlet and a fluid outlet and a flow path for causing the fluid inlet to communicate with the fluid outlet, for controlling a flow rate of the fluid flowing in said pipe;
      a valve for opening/closing said pipe; and
      a casing for storing said pipe, said flow control apparatus, and said valve,
   wherein at least one of the fluid inlet and the fluid outlet of said flow control apparatus is positioned such that a flow direction of the fluid at a corresponding one of the fluid inlet and the fluid outlet is perpendicular to the flow path, and said flow control apparatus is positioned near a wall portion of said casing.

* * * * *